(12) United States Patent
Nishijima et al.

(10) Patent No.: US 11,898,065 B2
(45) Date of Patent: Feb. 13, 2024

(54) RESIN COMPOSITION FOR SEALANT, LAMINATE, PACKAGING MATERIAL, AND PACKAGE

(71) Applicant: DOW-MITSUI POLYCHEMICALS CO., LTD., Tokyo (JP)

(72) Inventors: Koichi Nishijima, Ichihara (JP); Hiroaki Machiya, Ichihara (JP); Hisao Gonohe, Ichihara (JP); Yoshitaka Hironaka, Ichihara (JP)

(73) Assignee: DOW-MITSUI POLYCHEMICALS CO., LTD., Tokyo (JP)

( * ) Notice: Subject to any disclaimer, the term of this patent is extended or adjusted under 35 U.S.C. 154(b) by 0 days.

(21) Appl. No.: 17/293,504

(22) PCT Filed: Nov. 19, 2019

(86) PCT No.: PCT/JP2019/045273
§ 371 (c)(1),
(2) Date: May 13, 2021

(87) PCT Pub. No.: WO2020/110829
PCT Pub. Date: Jun. 4, 2020

(65) Prior Publication Data
US 2021/0403770 A1 Dec. 30, 2021

(30) Foreign Application Priority Data

Nov. 30, 2018 (JP) .................................. 2018-225788

(51) Int. Cl.
| | | |
|---|---|---|
| *B32B 1/02* | (2006.01) | |
| *C09J 123/08* | (2006.01) | |
| *B32B 1/00* | (2006.01) | |
| *B32B 27/08* | (2006.01) | |
| *B32B 27/30* | (2006.01) | |
| *B32B 27/32* | (2006.01) | |
| *B65D 65/40* | (2006.01) | |
| *C08L 23/08* | (2006.01) | |
| *B32B 1/08* | (2006.01) | |

(52) U.S. Cl.
CPC ........... *C09J 123/0869* (2013.01); *B32B 1/00* (2013.01); *B32B 27/08* (2013.01); *B32B 27/306* (2013.01); *B32B 27/308* (2013.01); *B32B 27/32* (2013.01); *B65D 65/40* (2013.01); *C08L 23/0869* (2013.01); *B32B 2250/03* (2013.01); *B32B 2250/246* (2013.01); *B32B 2307/31* (2013.01); *B32B 2439/40* (2013.01); *C08L 2203/162* (2013.01); *C08L 2205/03* (2013.01); *C08L 2205/035* (2013.01); *C08L 2310/00* (2013.01)

(58) Field of Classification Search
CPC ......... B32B 27/308; B32B 1/02; B32B 27/32; B32B 27/302; B32B 27/306; B32B 25/08; Y10T 428/31913; Y10T 428/1352; Y10T 428/31855; Y10T 428/31813; C09J 123/0869; C09J 123/0853; C08L 23/0853; C08L 23/16; C08L 9/06; C08L 23/0869; C08L 2205/03; C08K 5/20
USPC .................... 428/35.7, 516, 500; 429/516
See application file for complete search history.

(56) References Cited

U.S. PATENT DOCUMENTS

| | | | | |
|---|---|---|---|---|
| 2002/0172834 | A1* | 11/2002 | Rivett ..................... | B32B 27/32 |
| | | | | 428/515 |
| 2006/0014022 | A1* | 1/2006 | Kendig ................. | B32B 27/304 |
| | | | | 525/88 |

FOREIGN PATENT DOCUMENTS

| | | | |
|---|---|---|---|
| CN | 101124279 | A | 2/2008 |
| JP | 55-84659 | A | 6/1980 |
| JP | 60-47053 | A | 3/1985 |
| JP | 61-183371 | A | 8/1986 |
| JP | 61183371 | A * | 8/1986 |
| JP | 06001953 | A * | 1/1994 |
| JP | 6-31876 | A | 2/1994 |
| JP | 9-109324 | A | 4/1997 |
| JP | 2005-187744 | | 7/2005 |
| JP | 2007-084691 | | 4/2007 |
| JP | 2008-95044 | A | 4/2008 |
| JP | 2010-090353 | | 4/2010 |
| JP | 5048991 | B2 | 10/2012 |
| JP | 5188177 | | 4/2013 |
| WO | 2006/090722 | A1 | 8/2006 |

OTHER PUBLICATIONS

International Search Report (ISR) dated Feb. 10, 2020 filed in PCT/JP2019/045273.
Indian Office Action (INOA) dated Nov. 24, 2021 for corresponding Indian Patent Application No. 202117024927.
Japanese Office Action (JPOA) dated May 10, 2022 for Japanese Patent Application No. 2020-557556; English machine translation.
Chinese Office Action (CNOA) dated Sep. 5, 2022 for Chinese Patent Application No. 201980073987.0; English translation.
Extended European Search Report (EESR) dated Dec. 12, 2022 in European Patent Application No. 19891212.3.

* cited by examiner

*Primary Examiner* — Marc A Patterson
(74) *Attorney, Agent, or Firm* — RANKIN, HILL & CLARK LLP

(57) ABSTRACT

A resin composition for a sealant has excellent heat-sealing strength with respect to a substrate, and a reduced elution amount thereof into normal heptane.
A resin composition for a sealant includes: a resin (A) which is an ethylene-(meth)acrylic acid ester copolymer in which a content of a (meth)acrylic acid ester unit is from 10% by mass to 25% by mass; and a tackifying resin (B), in which a content of the resin (A) is more than 45% by mass with respect to a total amount of resin components in the resin composition for a sealant, and a content of the tackifying resin (B) is from 0.1% by mass to 10% by mass with respect to the total amount of the resin components in the resin composition for a sealant.

11 Claims, No Drawings

RESIN COMPOSITION FOR SEALANT, LAMINATE, PACKAGING MATERIAL, AND PACKAGE

TECHNICAL FIELD

The present disclosure relates to a resin composition for a sealant, a laminate, a packaging material, and a package.

RELATED ART

Conventionally, various studies have been conducted on a resin composition for a sealant. A resin composition for a sealant is also referred to as a resin composition for a sealing material.

For example, Japanese Patent Application Laid-Open No. 2008-95044 discloses a resin composition for a sealing material which contains from 30 to 80 parts by mass of an ethylene-vinyl ester copolymer resin (A), from 1 to 45 parts by mass of an ethylene-(meth)acrylic acid ester copolymer resin (B), and from 3 to 30 parts by mass of a tackifying resin (C) (wherein, a total amount of the resins (A), (B), and (C) is 100 parts by mass), the resin composition for a sealing material being a heat-sealing resin composition which is suitable as a heat-sealing material used for a plastic container, and particularly for a high-impact polystyrene container, has a peeling strength within an appropriate range with respect to a container main body structural member as compared to a conventional composition, maintains physical properties required as a heat-sealing material for a sealing protective property of a container content, such as a food, that are almost similar to those of the conventional composition, and exhibits a higher heat resistance and a smooth and comfortable peeling property in spite of a heat-sealing treatment at a low temperature as compared to the conventional composition.

SUMMARY OF THE INVENTION

It may be required for the resin composition for a sealing material described in JP-A No. 2008-95044 (that is, the resin composition for a sealant) to have a further increased heat-seal strength to a substrate.

In addition, from the viewpoint of hygiene, it may be required for the resin composition for a sealant to have a reduced elution amount into normal heptane.

The disclosure has been prepared in consideration of the above circumstances.

An object of a first aspect of the disclosure is to provide a resin composition for a sealant that has excellent heat-sealing strength with respect to a substrate and a reduced elution amount into normal heptane.

An object of a second aspect of the disclosure is to provide a laminate that includes a substrate layer and a sealant layer, that has excellent heat-sealing strength with respect to a substrate, and in which the sealant layer has a reduced elution amount into normal heptane.

An object of a third aspect of the disclosure is to provide a packaging material that includes the laminate, that has excellent heat-sealing strength with respect to a substrate, and in which the sealant layer has a reduced elution amount into normal heptane.

An object of a fourth aspect of the disclosure is to provide a package that includes a substrate, a laminate including a substrate layer and a sealant layer, and a packaged object, that has excellent heat-sealing strength between the substrate and the laminate, and in which the sealant layer has a reduced elution amount into normal heptane.

The disclosure includes the following aspects.

<1> A resin composition for a sealant, containing:
a resin (A) that is an ethylene-(meth)acrylic acid ester copolymer in which a content of a (meth)acrylic acid ester unit is from 10% by mass to 25% by mass; and
a tackifying resin (B),
wherein a content of the resin (A) is more than 45% by mass with respect to a total amount of resin components in the resin composition for a sealant, and
a content of the tackifying resin (B) is from 0.1% by mass to 10% by mass with respect to a total amount of resin components in the resin composition for a sealant.

<2> The resin composition for a sealant according to <1>, further comprising a resin (C) that is an ethylene-vinyl ester copolymer.

<3> The resin composition for a sealant according to <1> or <2>, further comprising a resin (D) that is at least one selected from the group consisting of an ethylene-α-olefin copolymer elastomer, a styrene-based elastomer and polyethylene.

<4> The resin composition for a sealant according to <3>, wherein a content of the resin (D) is from 5% by mass to 40% by mass with respect to a total amount of resin components in the resin composition.

<5> The resin composition for a sealant according to any one of <1> to <4>, used as a sealant for a packaging material.

<6> The resin composition for a sealant according to <5>, wherein the packaging material is for skin pack packaging.

<7> A laminate, including:
a substrate layer; and
a sealant layer containing the resin composition for a sealant according to any one of <1> to <6>.

<8> The laminate according to <7>, wherein the substrate layer contains at least one selected from the group consisting of an ionomer of an ethylene-unsaturated carboxylic acid copolymer and an ethylene-unsaturated ester copolymer.

<9> The laminate according to <7> or <8>, wherein a thickness of the laminate is from 40 μm to 300 μm.

<10> A packaging material, including the laminate according to any one of <7> to <9>.

<11> The packaging material according to <10>, further including a substrate.

<12> The packaging material according to <11>, wherein the substrate contains polypropylene.

<13> A package, including:
a substrate;
the laminate according to any one of <7> to <9>; and
a packaged object packaged by the substrate and the laminate.

According to the first aspect of the disclosure, there is provided a resin composition for a sealant that has excellent heat-sealing strength with respect to a substrate and a reduced elution amount into normal heptane.

According to the second aspect of the disclosure, there is provided a laminate that includes a substrate layer and a sealant layer, that has excellent heat-sealing strength with respect to a substrate, and in which the sealant layer has a reduced elution amount into normal heptane.

According to the third aspect of the disclosure, there is provided a packaging material that includes the laminate, that has excellent heat-sealing strength with respect to a substrate, and in which the sealant layer has a reduced elution amount into normal heptane.

According to the fourth aspect of the disclosure, there is provided a package that includes a substrate, a laminate including a substrate layer and a sealant layer, and a packaged object, that has excellent heat-sealing strength between the substrate and the laminate, and in which the sealant layer has a reduced elution amount into normal heptane.

DETAILED DESCRIPTION OF THE INVENTION

In the disclosure, a range of numerical values indicated by "to" represents a range including numerical values described before and after "to" as the minimum value and the maximum value, respectively.

In the disclosure, in a case in which a plurality of substances corresponding to components are present in the composition, the amount of each component in the composition means the total amount of the plurality of substances present in the composition, unless otherwise noted.

In the numerical value range described in a stepwise manner in the disclosure, an upper limit value or a lower limit value described in a certain numerical value range may be replaced with an upper limit value or a lower limit value of the numerical value range of another stepwise description or may be replaced with values shown in examples.

In the disclosure, "(meth)acrylic acid" is a concept that encompasses both acrylic acid, and methacrylic acid and "(meth)acrylic acid ester" is a concept that encompasses both an acrylic acid ester and a methacrylic acid ester.

Resin Composition for Sealant

A resin composition for a sealant of the disclosure contains: a resin (A) that is an ethylene-(meth)acrylic acid ester copolymer in which a content of a (meth)acrylic acid ester unit is from 10% by mass to 25% by mass; and a tackifying resin (B), in which a content of the resin (A) is more than 45% by mass with respect to a total amount of resin components in the resin composition for a sealant, and a content of the tackifying resin (B) is from 0.1% by mass to 10% by mass with respect to a total amount of resin components in the resin composition for a sealant.

The resin composition for a sealant of the disclosure has excellent heat-sealing strength with respect to a substrate.

The resin composition for a sealant of the disclosure has a reduced elution amount into normal heptane, the elution amount being one of hygienic indices.

The reason that the effects are exhibited is assumed as follows.

It is considered that the followings are contributing to the effect of excellent heat-sealing strength with respect to a substrate: the content of the (meth)acrylic acid ester unit in the resin (A) (that is, ethylene-(meth)acrylic acid ester copolymer) is 10% by mass or more; the content of the resin (A) with respect to the total amount of the resin components in the resin composition for a sealant (hereinafter, simply referred to as "the content of the resin (A)") is more than 45% by mass; and the content of the tackifying resin (B) is 0.1% by mass or more.

It is considered that, the followings are contributing to the effect of reducing the elution amount into normal heptane to some extent: the content of the tackifying resin (B) with respect to the total amount of the resin components in the resin composition for a sealant (hereinafter, simply referred to as "the content of the tackifying resin (B)") is 10% by mass or less; and the content of the (meth)acrylic acid ester unit in the resin (A) (that is, ethylene-(meth)acrylic acid ester copolymer) is 25% by mass or less.

In particular, the resin composition for a sealant of the disclosure has excellent adhesion to a substrate containing a resin [for example, polyethylene (PE), polypropylene (PP), polystyrene (PS), high-impact polystyrene (HIPS), polyethylene terephthalate (PET), a mixture of polyethylene (PE) and polybutene (PB), or a mixture of polyethylene (PE) and polypropylene (PP)].

The substrate containing a resin may further contain a filler and the like.

In a case in which a film is used as a substrate containing PE, PP, PS, HIPS, or PET, the film may be a stretched film or a non-stretched film.

Examples of a substrate containing a mixture of PE and PB or a mixture of PE and PP include a cohesive failure film.

Among the substrates containing the resin described above, for example, the substrate containing polypropylene (PP) is relatively difficult to secure a heat-seal strength to another object. The resin composition for a sealant of the disclosure has an excellent heat-seal strength even to a substrate containing polypropylene (PP) (see Examples described later).

Resin (A)

The resin composition for a sealant of the disclosure contains a resin (A).

The resin (A) is an ethylene-(meth)acrylic acid ester copolymer in which a content of a (meth)acrylic acid ester unit (that is, a structural unit derived from a (meth)acrylic acid ester) is from 10% by mass to 25% by mass.

Here, the content of the (meth)acrylic acid ester unit is a content with respect to a total amount of the ethylene-(meth) acrylic acid ester copolymer (that is, the resin (A)) (when two or more types of (meth)acrylic acid ester units are included in the resin (A), the content means a total content thereof).

The resin (A) contained in the resin composition for a sealant of the disclosure may be used singly, or in combination of two or more kinds thereof.

The (meth)acrylic acid ester unit contained in the resin (A) may be used singly, or in combination of two or more kinds thereof.

In the resin composition for a sealant of the disclosure, the content of the (meth)acrylic acid ester unit in the resin (A) is 10% by mass or more, such that the heat-seal strength to the substrate of the resin composition for a sealant is increased. From the viewpoint of further increasing a heat-seal strength to a substrate, the content of the (meth)acrylic acid ester unit in the resin (A) is preferably 15% by mass or more and more preferably 18% by mass or more.

In the resin composition for a sealant of the disclosure, the content of the (meth)acrylic acid ester unit in the resin (A) is 25% by mass or less, such that the resin composition for a sealant has a reduced elution amount into normal heptane. From the viewpoint of reducing the elution amount of the resin composition for a sealant into normal heptane, the content of the (meth)acrylic acid ester unit in the resin (A) is preferably 24% by mass or less and more preferably 22% by mass or less.

A content of an ethylene unit (that is, a structural unit derived from ethylene) in the resin (A) is preferably from 75% by mass to 90% by mass.

Here, the content of the ethylene unit is a content with respect to the total amount of the ethylene-(meth)acrylic acid ester copolymer (that is, the resin (A)).

In the resin composition for a sealant of the disclosure, the content of the ethylene unit in the resin (A) is 90% by mass or less, such that the heat-sealing strength with respect to the substrate of the resin composition for a sealant is increased. From the viewpoint of further increasing heat-sealing strength with respect to the substrate of the resin composition for a sealant, the content of the ethylene unit in the resin (A) is preferably 85% by mass or less and more preferably 82% by mass or less.

In the resin composition for a sealant of the disclosure, the content of the ethylene unit in the resin (A) is 75% by mass or more, such that the resin composition for a sealant has a reduced elution amount into normal heptane.

From the viewpoint of reducing the elution amount of the resin composition for a. sealant into normal heptane, the content of the ethylene unit in the resin (A) is preferably 76% by mass or more and more preferably 78% by mass or more.

The ethylene-(meth)acrylic acid ester copolymer (that is, the resin (A)) may or need not contain other structural units in addition to the ethylene unit and the (meth)acrylic acid ester unit.

The total content of the ethylene unit and the (meth) acrylic acid ester unit in the resin (A) is preferably 80% by mass or more and more preferably 90% by mass or more with respect to the total amount of the resin (A).

As a monomer for forming the (meth)acrylic acid ester unit, a (meth)acrylic acid alkyl ester is preferable and a (meth)acrylic acid alkyl ester having from 1 to 10 carbon atoms in an alkyl ester moiety (that is, an alkoxy group) is more preferable.

In the monomer for forming the (meth)acrylic acid ester unit, the number of carbon atoms of the alkyl ester moiety (that is, the alkoxy group) is more preferably from 1 to 8, still more preferably from 1 to 6, still more preferably from 1 to 4, and still more preferably 1 or 2.

Examples of the monomer for forming the (meth)acrylic acid ester unit include methyl (meth)acrylate, ethyl (meth) acrylate, n-propyl (meth)acrylate, isopropyl (meth)acrylate, n-butyl (meth)acrylate, isobutyl (meth)acrylate, n-hexyl (meth)acrylate, isohexyl (meth)acrylate, n-octyl (meth)acrylate, isooctyl (meth)acrylate, and 2-ethylhexyl (meth)acrylate.

A melt flow rate (MFR: measured in accordance with JIS K7210-1999 under a condition at 190° C. and 2,160 g load) of the resin (A) is preferably from 0.1 g/10 min to 100 g/10 min, more preferably from 1 g/10 min to 50 g/10 min, and still more preferably from 1 g/10 min to 30 g/10 min, from the viewpoint of a characteristic and workability as a resin composition for a sealant.

A synthesis method of the resin (A) is not particularly limited and a known synthesis method can be applied.

For the synthesis method of the resin (A), for example, the descriptions in paragraphs 0020 to 0023 of JP-A No. 2008-95044 can be referred, as appropriate.

Specifically, in the disclosure, as the ethylene-(meth) acrylic acid ester copolymer (resin (A)), it is particularly preferable to use a copolymer resin produced by a tubular high-pressure polymerization method.

The copolymer resin obtained by this method has a higher melting point compared with an ethylene (meth) acrylic acid ester copolymer produced by another method such as a usual radical polymerization method, even if the copolymer composition and the average molecular weight are the same. Further, a thermal property such as a viscoelastic behavior in a softening to a molten state, and other attributes of the copolymer resin obtained by this method are different from those produced by another method, so that a composition obtained by blending the copolymer resin obtained by this method exhibits better characteristics of the above described composition of the disclosure.

A tubular high-pressure polymerization method is a method of radical polymerization using a free radical catalyst at high pressure using a tubular reactor, and examples thereof include a method described in Japanese Patent Application Laid-open (JP-A) No. S62-273214.

Specifically, the tubular high-pressure polymerization method is performed by (a) utilizing a tubular reactor, (b) setting the reactor inlet pressure being from 2300 kg/cm$^2$ to 3000 kg/cm$^2$, and preferably from 2400 kg/cm$^2$ to 2800 kg/cm$^2$, (c) setting the average reaction temperature (T) in the reactor as 190° C.<T AV<230° C., and (d) ethylene is introduced from the inlet of the reactor, or from the inlet and at least one side portion, and the total amount of ethyl acrylate, that is, a co-monomer is introduced from the inlet, thereby radically polymerizing in the presence of a free radical catalyst and a chain transfer agent, and an auxiliary agent if necessary.

In the copolymer obtained by the polymerization method, a relation between (meth) acrylic acid ester content E (% by weight) and a copolymer melting point T (° C.) is expressed by the following formula (I).

$$-0.8 \times E + 115 \geq T \geq -0.8 \times E + 109 \qquad (I)$$

It is characterized in that the copolymer obtained by the polymerization method has a melting point higher than that of a copolymer having an equivalent composition obtained by another polymerization method and excellent in heat resistance.

The copolymer obtained by the above polymerization method has less random sequence of ethylene units or (meth) acrylic acid ester unit, that has a high sequence non-uniformity, and that has a polymer structure and a physical property similar to those of block copolymers, as compared with copolymers having good randomness produced by conventional radical polymerization methods.

Therefore, it is considered that the melting point and the ester unit content have the above relationship.

The content of the resin (A) with respect to the total amount of the resin components in the resin composition for a sealant of the disclosure (hereinafter, simply referred to as "the content of the resin (A)") is more than 45% by mass. Thereby, heat-sealing strength with respect to the substrate of the resin composition for a sealant is increased.

From the viewpoint of further increasing heat-sealing strength with respect to the substrate of the resin composition for a sealant, the content of the resin (A) is preferably 46% by mass or more, more preferably 47% by mass or more, and still more preferably 50% by mass or more.

An upper limit of a content of the resin (A) depends on a content of other components such as the tackifying resin (B).

The upper limit of the content of the resin (A) is 99.9% by mass in principle. Examples of an upper limit of the content of the resin (A) include 98.9% by mass, 98% by mass, 97.9% by mass, 90% by mass, 80% by mass, 70% by mass, and 65% by mass.

In the disclosure, the resin component includes at least the resin (A) and a tackifying resin (B) described later.

In a case in which the resin composition for a sealant of the disclosure contains a resin (C) described later, the resin component also includes the resin (C).

In a case in which the resin composition for a sealant of the disclosure contains a resin (D) described later, the resin component also includes the resin (D).

In the resin composition for a sealant of the disclosure, a total content of the resin components is preferably 80% by mass or more and more preferably 90% by mass or more with respect to the total amount of the resin composition for a sealant.

Tackifying Resin (B)

The resin composition for a sealant of the disclosure contains a tackifying resin (B).

The tackifying resin (B) contained in the resin composition for a sealant may be used singly, or in combination of two or more kinds thereof.

Examples of the tackifying resin (B) include an aliphatic hydrocarbon resin, an alicyclic hydrocarbon resin, an aromatic hydrocarbon resin, a styrene resin, a terpene resin, and rosins.

Examples of the aliphatic hydrocarbon resin include a polymer of a monomer raw material which is mainly composed of $C_4$-$C_5$ monoolefin or diolefin, such as 1-butene, isobutane, butadiene, 1,3-pentadiene, isoprene, and piperylene.

Examples of the alicyclic hydrocarbon resin include a resin obtained by polymerizing diene components in a spent C4-$C_5$ fraction after cyclization and dimerization, a resin obtained by polymerizing a cyclic monomer such as cyclopentadiene, and a resin obtained by intranuclear hydrogenation of an aromatic hydrocarbon resin.

Examples of the aromatic hydrocarbon resin include a polymer of a monomer raw material which is mainly composed of C9-$C_{10}$ vinyl aromatic hydrocarbon, such as vinyl toluene, indene, and α-methyl styrene.

Examples of the styrene resin include a polymer of a monomer raw material which is mainly composed of styrene, vinyl toluene, α-methyl styrene, or isopropenyl toluene.

Examples of the terpene resin include an α-pinene polymer, a β-pinene polymer, a dipentene polymer, a terpene-phenol copolymer, an α-pinene-phenol copolymer, and a hydrogenated terpene resin.

Examples of the rosins include a rosin, a polymerized rosin, a hydrogenated rosin, a rosin ester, a rosin phenol resin, and an ester of a rosin phenol resin.

As the tackifying resin, an alicyclic hydrocarbon resin, an aliphatic hydrocarbon resin, or a hydrogenated terpene resin is preferable, and an alicyclic hydrocarbon resin is more preferable.

A ring and ball method softening point of the tackifying resin is preferably from 70° C. to 150°, and more preferably from 100° C. to 130°.

The ring and ball method softening point means a value measured in accordance with JIS K6863 (1994).

The content of the tackifying resin (B) with respect to the total amount of the resin components in the resin composition for a sealant of the disclosure (hereinafter, simply referred to as "the content of the tackifying resin (B)") is from 0.1% by mass to 10% by mass.

In the resin composition for a sealant of the disclosure, the content of the tackifying resin (B) is 0.1% by mass or more, such that heat-sealing strength with respect to the substrate of the resin composition for a sealant is increased. From the viewpoint of further increasing heat-sealing strength with respect to the substrate of the resin composition for a sealant, the content of the tackifying resin (B) is preferably 0.5% by mass or more, more preferably 1% by mass or more, and still more preferably 1.5% by mass or more.

The content of the tackifying resin (B) is 10% by mass or less, such that the resin composition for a sealant has a reduced elution amount into normal heptane. From the viewpoint of reducing the elution amount of the resin composition for a sealant into normal heptane, the content of the tackifying resin (B) is preferably 5% by mass or less, more preferably 3% by mass or less, still more preferably less than 3% by mass and particularly preferably less than 2.5% by mass.

Resin (C)

It is preferable that the resin composition for a sealant of the disclosure further contains a resin (C) which is an ethylene-vinyl ester copolymer.

In this case, the resin (C) contained may be used singly, or in combination of two or more kinds thereof.

In the case in which the resin composition for a sealant of the disclosure further contains the resin (C), when a film-shaped laminate is produced as a laminate described later, it is advantageous in that roll sticking when producing the laminate is reduced and adhesion between films is reduced.

The resin (C) (that is, ethylene-vinyl ester copolymer) contains an ethylene unit (that is, a structural unit derived from ethylene) and a vinyl ester unit (that is, a structural unit derived from a vinyl ester).

As a vinyl ester for forming a vinyl ester unit, vinyl acetate or vinyl propionate is preferable and vinyl acetate is more preferable.

A content of the vinyl ester unit with respect to a total amount of the resin (C) (that is, ethylene-vinyl ester copolymer) (hereinafter, simply referred to as "the content of the vinyl ester unit") is preferably from 2% by mass to 30% by mass, more preferably from 5% by mass to 25% by mass, still more preferably from 6% by mass to 19% by mass, and still more preferably from 7% by mass to 13% by mass.

In the case in which the content of the vinyl ester is 2% by mass or more, heat-sealing strength with respect to the substrate of the resin composition for a sealant is further increased.

In the case in which the content of the vinyl ester is 30% by mass or less, heat-sealing strength with respect to the substrate of the resin composition for a sealant is further increased, and the resin composition for a sealant has a further reduced elution amount into normal heptane.

A content of the ethylene unit with respect to the total amount of the resin (C) (that is, ethylene-vinyl ester copolymer) (hereinafter, simply referred to as "the content of the ethylene unit") is preferably from 70% by mass to 98% by mass, more preferably from 75% by mass to 95% by mass, still more preferably from 81% by mass to 94% by mass, and still more preferably from 87% by mass to 93% by mass.

In the case in which the content of the ethylene unit is 98% by mass or less, heat-sealing strength with respect to the substrate of the resin composition for a sealant is further increased.

In the case in which the content of the ethylene unit is 70% by mass or more, heat-sealing strength with respect to the substrate of the resin composition for a sealant is further increased, and the resin composition for a sealant has a further reduced elution amount into normal heptane.

The resin (C) (that is, ethylene-vinyl ester copolymer) may or need not contain other structural units in addition to the ethylene unit and the vinyl ester unit.

The total content of the ethylene unit and the vinyl ester unit in the resin (C) is preferably 80% by mass or more and more preferably 90% by mass or more with respect to the total amount of the resin (C).

A melt flow rate (MFR: measured in accordance with JIS K7210-1999 under a condition at 190° C. and 2,160 g load) of the resin (C) is preferably from 0.1 g/10 min to 100 g/10 min, more preferably from 1 g/10 min to 50 g/10 min, and still more preferably from 1 g/10 min to 30 g/10 min, from the viewpoint of a characteristic and workability as a resin composition for a sealant.

In the case in which the resin composition for a sealant of the disclosure contains the resin (C), the content of the resin (C) with respect to the total amount of the resin components in the resin composition for a sealant (hereinafter, simply referred to as "the content of the resin (C)") is preferably from 1% by mass to 50% by mass, more preferably from 5% by mass to 45% by mass, and still more preferably from 15% by mass to 45% by mass.

In the case in which the content of the resin (C) is 50% by mass or less, heat-sealing strength with respect to the substrate of the resin composition for a sealant is further increased.

In the case in which the content of the resin (C) is 1% by mass or more, when a film-shaped laminate is produced as a laminate described later, it is advantageous in that roll sticking when producing the laminate is reduced and adhesion between films is reduced.

Resin (D)

It is preferable that the resin composition for a sealant of the disclosure further contains a resin (D) which is at least one selected from the group consisting of an ethylene-α-olefin copolymer elastomer, a styrene-based elastomer, and polyethylene.

In the case in which the resin composition for a sealant of the disclosure further contains the resin (D), heat-sealing strength with respect to the substrate of the resin composition for a sealant is further increased.

From the viewpoint of obtaining further effectiveness, it is preferable that the resin (D) further contains at least one selected from the group consisting of an ethylene-α-olefin copolymer elastomer and a styrene-based elastomer.

The ethylene-α-olefin copolymer elastomer is an elastomer containing an ethylene unit and an α-olefin unit (that is, a structural unit derived from α-olefin).

The number of carbon atoms of α-olefin for forming the α-olefin unit is preferably from 3 to 10 and more preferably from 3 to 8.

Examples of α-olefin for forming the α-olefin unit include propylene, 1-butene, 1-pentene, 1-hexene, 1-octene, and 4-methyl-1-pentene.

The ethylene-α-olefin copolymer elastomer is preferably an ethylene-1-butene copolymer elastomer, an ethylene-propylene copolymer elastomer, or an ethylene-1-octene copolymer elastomer.

The ethylene-α-olefin copolymer elastomer is produced, for example, by performing random copolymerization on ethylene and α-olefin in the presence of a catalyst combination of a transition metal compound (for example, a vanadium compound or a zirconium compound) and an organic aluminum compound.

A degree of crystallization of the ethylene-α-olefin copolymer elastomer measured by an X-ray is preferably from 1% to 20% (more preferably from 3% to 15%).

There are slight differences depending on the type of catalyst to be used or α-olefin, and examples of a method of obtaining the ethylene-α-olefin copolymer elastomer having the degree of crystallization include a method of copolymerizing ethylene and α-olefin so that a copolymerization ratio of the α-olefin is from 7 mole % to 20 mole % (preferably from 8 mole % to 16 mole %).

A melt flow rate (MFR: measured in accordance with JIS K7210-1999 under a condition at 190° C. and 2,160 g load) of the ethylene-α-olefin copolymer elastomer is preferably from 0.1 g/10 min to 100 g/10 min, more preferably from 1 g/10 min to 50 g/10 min, and still more preferably from 1 g/10 min to 30 g/10 min.

A density of the ethylene-α-olefin copolymer elastomer is preferably from 850 kg/m$^3$ to less than 900 kg/m$^3$, more preferably from 860 kg/m$^3$ to 890 kg/m$^3$, and still more preferably from 860 kg/m$^3$ to 880 kg/m$^3$.

Examples of the styrene-based elastomer include an A-B-A type block copolymer (wherein A represents a styrene copolymer block and B represents an alkylene copolymer block).

Here, the styrene copolymer block refers to a portion of polystyrene, and the alkylene copolymer block refers to a portion of an alkylene copolymer obtained by copolymerizing two or more alkenes.

Examples of the alkylene copolymer block include an ethylene-butene copolymer block and an ethylene-propylene copolymer block.

Such a block copolymer is obtained by hydrogenating a styrene-butadiene-styrene block copolymer, or a butadiene copolymer unit or an isoprene copolymer unit of a styrene-isoprene-styrene block copolymer.

Examples of the A-B-A type block copolymer include polystyrene-poly(ethylene-butylene)-polystyrene triblock copolymer (SEGS) and polystyrene-poly(ethylene-propylene)-polystyrene triblock copolymer (SEPS).

Specific examples of the A-B-A type block copolymer include Kraton G1657 produced by Kraton Corporation, and Tuftec H1221 produced by Asahi Kasei Corporation.

A melt flow rate (MFR: measured in accordance with JIS K7210-1999 under a condition at 230° C. and 5,000 g load) of the styrene-based elastomer (preferably the A-B-A type block copolymer) is preferably from 0.1 g/10 min to 100 g/10 min, more preferably from 1 g/10 min to 50 g/10 min, and still more preferably from 1 g/10 min to 30 g/10 min.

Examples of the polyethylene include high-density polyethylene (HDPE), low-density polyethylene (LDPE), medium-density polyethylene (NE/PE), and linear low-density polyethylene (LLDPE).

A density of polyethylene depends on the type of polyethylene, and preferably 900 kg/m$^3$ or more and more preferably 910 kg/m$^3$ or more. An upper limit of the density of polyethylene is not particularly limited, and the upper limit is, for example, 960 kg/m$^3$.

A density of HDPE is preferably 942 kg/m$^3$ or more and more preferably from 942 kg/m$^3$ to 960 kg/m$^3$.

A density of MDPE is preferably from 930 kg/m$^3$ to less than 942 kg/m$^3$.

A density of LDPE is preferably from 910 kg/m$^3$ to less than 930 kg/m$^3$.

A density of LLDPE is preferably from 900 kg/m$^3$ or to less than 930 kg/m$^3$.

A melt flow rate (MFR: measured in accordance with JIS K7210-1999 under a condition at 190° C. and 2,160 g load) of polyethylene is preferably from 0.1 g/10 min to 100 g/10 min, more preferably from 1 g/10 min to 50 g/10 min, and still more preferably from 1 g/10 min to 30 g/10 min.

In the case in which the resin composition for a sealant of the disclosure contains the resin (D), the content of the resin (D) with respect to the total amount of the resin components in the resin composition for a sealant (hereinafter, simply referred to as "the content of the resin (D)") is preferably from 1% by mass to 50% by mass, more preferably from 5% by mass to 40% by mass, and still more preferably from 10% by mass to 30% by mass.

In the case in which the content of the resin (D) is 1% by mass or more, heat-sealing strength with respect to the substrate of the resin composition for a sealant is further increased.

In the case in which the content of the resin (D) is 50% by mass or less, an excessive heat-sealing strength with respect to the substrate of the resin composition for a sealant is further suppressed.

Other Components

The resin composition for a sealant of the disclosure may contain other components in addition to the components described above.

An example of the other components includes an additive such as a slipping agent or a roll release agent.

Examples of the additive include: various amides such as palmitic acid amide, stearic acid amide, behenic acid amide, oleic acid amide, erucic acid amide, oleyl palmitamide, stearyl palmitamide, methylene bis stearylamide, methylene bis oleylamide, and ethylene bis erucic acid amide; polyalkylene glycol such as polyethylene glycol and polypropylene glycol; hydrogenated castor oil; and an inorganic additive such as silica, talc, and zeolite.

A content of the additive is preferably from 0.01% by mass to 3% by mass with respect to the total amount of the resin components.

In the resin composition for a sealant of the disclosure, the total content of the resin components is preferably 80% by mass or more and more preferably 90% by mass or more with respect to the total amount of the resin composition for a sealant.

In the disclosure, the resin component includes at least the resin (A) and the tackifying resin (B).

In the case in which the resin composition for a sealant of the disclosure contains the resin (C), the resin component also includes the resin (C). A preferred embodiment according to the resin composition for a sealant of the disclosure is that the composition contains the resin (A), the tackifying resin (B) and the resin (C), as the resin components, in which the content of the resin (A) i s more than 45% by mass, the content of the tackifying resin (B) is from 0.1% by mass to 10% by mass, and the content of the resin (C) is from 1% by mass to 50% by mass, with respect to the total amount of the resin composition for a sealant.

In the case in which the resin composition for a sealant of the disclosure contains the resin (D), the resin component also includes the resin (D). A preferred embodiment according to the resin composition for a sealant of the disclosure is that the composition contains the resin (A), the tackifying resin (B), the resin (C), and the resin (D), as the resin components, in which the content of the resin (A) is more than 45% by mass, the content of the tackifying resin (B) is from 0.1% by mass to 10% by mass, and the content of the resin (C) is from 1% by mass to 50% by mass, and the content of the resin (D) is from 1% by mass to 50% by mass, with respect to the total amount of the resin composition for a sealant.

Preferred Application

The resin composition for a sealant of the disclosure can be applied to various applications which are required to increase heat-sealing strength with respect to the substrate and reduce the elution amount into normal heptane.

Applications of the resin composition for a sealant of the disclosure are not particularly limited, and the resin composition for a sealant is preferably used as a sealant for a packaging material.

An example of the packaging material includes a packaging material for packaging a food, a toy, stationery, a household good, a cosmetic, a medicine, a quasi-drug, and medical instrument.

The packaging material is preferably a packaging material for a food.

Examples of the food include meat, a meat product, a meat dish, seafood, a seafood dish, a processed seafood, a daily dish, a cooked pasta, and a milk processed product.

The food can refer to Notification No. 370 by The Ministry of Health and Welfare ("Standards for Food and Additives").

In addition, the packaging material is preferably a packaging material for skin pack packaging.

The skin pack packaging means vacuum packaging in a state in which at least a part of the packaging material is closely adhered to a packaged object while following the shape of the packaged object.

In the skin pack packaging, a sealant is used in order to realize the vacuum packaging of the above state.

Since the packaging material for skin pack packaging often includes a substrate (for example, a container and a tray), the sealant for such a packaging material is often required to have heat-sealing strength with respect to the substrate. Since hygiene for maintaining the quality of the packaged object (for example, reduction of the elution amount into normal heptane) is often required for the packaging material for skin pack packaging, a sealant for a packaging material is often required to have a reduced elution amount into normal heptane.

For these reasons, as packaging material to which the resin composition for a sealant of the disclosure is applied, a packaging material for skin pack packaging is preferable.

Laminate

The laminate of the disclosure includes a substrate layer and a sealant layer containing the resin composition for a sealant of the disclosure described above.

Since the laminate of the disclosure includes a sealant layer containing the resin composition for a sealant of the disclosure, the laminate has excellent heat-sealing strength with respect to the substrate and a reduced elution amount from the sealant layer into normal heptane.

Substrate Layer

A substrate layer is a layer for securing the strength as a packaging material, in which the sealant layer containing the resin composition for a sealant of the disclosure described above is laminated on the substrate layer directly or via another layer.

A material of the substrate layer is not particularly limited. Examples of the material of the substrate layer include a stretched film and a non-stretched film, for example, polyester such as polyethylene terephthalate; polyamide; polyolefin such as polypropylene, and polyethylene; an ethylene-unsaturated ester copolymer such as an ethylene-vinyl acetate copolymer, and an ethylene-unsaturated carboxylic acid ester copolymer; an ethylene-unsaturated carboxylic acid copolymer or ionomer thereof; an ethylene-vinyl alcohol copolymer; a paper; aluminum foil; vapor-deposited film with aluminium, silica, alumina or magnesia; and a film coated with a gas barrier material such as polyvinylidene chloride, and polyvinyl alcohol.

A structure of the substrate layer may be a single layer structure and may be a laminated structure including two or more layers.

The substrate layer preferably contains a resin. Thermoplastic resin is preferably used as the resin. Thermoplastic resin is not particularly limited, and examples thereof include polyester such as polyethylene terephthalate; polyamide; polyolefin such as polypropylene, and polyethylene; an ethylene-unsaturated ester copolymer such as an ethylene-vinyl acetate copolymer, and an ethylene-unsaturated carboxylic acid ester copolymer; an ethylene-unsaturated carboxylic acid copolymer or ionomer thereof; and an ethylene-vinyl alcohol copolymer.

It is more preferable that the substrate layer contains at least one selected from the group consisting of an ionomer of an ethylene-unsaturated carboxylic acid copolymer and an ethylene-unsaturated ester copolymer.

In particular, in the case in which the substrate layer contains at least one selected from the above group, extensibility of the laminate is improved. The extensibility is a characteristic that may be required, for example, in a case in which the laminate is used as a packaging material.

In particular, in a case in which the laminate having excellent extensibility is used as a packaging material for skin pack packaging, followability to a shape of the packaged object and adhesiveness to the packaged object are further improved.

Ionomer of Ethylene-Unsaturated Carboxylic Acid Copolymer

The substrate layer may contain at least one ionomer of an ethylene-unsaturated carboxylic acid copolymer.

In the case in which the substrate layer contains the ionomer of the ethylene-unsaturated carboxylic acid copolymer, a puncture strength of the laminate is increased as well as the extensibility of the laminate.

The puncture strength is also a property that may be required in the case in which the laminate is used as a packaging material (in particular, the packaging material for skin pack packaging).

In the disclosure, the ionomer of the ethylene-unsaturated carboxylic acid copolymer means a compound in which at least a part of an acidic group (that is, carboxyl group) in the ethylene-unsaturated carboxylic acid copolymer as a base polymer is neutralized with a metal ion.

The ethylene-unsaturated carboxylic acid copolymer as a base polymer is a copolymer obtained by copolymerizing at least ethylene and unsaturated carboxylic acid, and includes an ethylene unit (that is, a structural unit derived from ethylene) and an unsaturated carboxylic acid unit (that is, a structural unit derived from unsaturated carboxylic acid).

The ethylene-unsaturated carboxylic acid copolymer may be any of a block copolymer, a random copolymer, and a graft copolymer.

From the viewpoint of industrial availability, the ethylene-unsaturated carboxylic acid copolymer is preferably a random copolymer.

Examples of the unsaturated carboxylic acid unit include a (meth)acrylic acid unit, a fumaric acid unit, and a maleic acid unit.

Among them, the unsaturated carboxylic acid unit is preferably a (meth)acrylic acid unit, and more preferably a methacrylic acid unit.

A content of the unsaturated carboxylic acid unit in the ethylene-unsaturated carboxylic acid copolymer as a base polymer is preferably from 1% by mass to 25% by mass, more preferably from 3% by mass to 20% by mass, and still more preferably from 5% by mass to 15% by mass, with respect to a total amount of the copolymer.

A content of the ethylene unit in the ethylene-unsaturated carboxylic acid copolymer as a base polymer is preferably from 75% by mass to 99% by mass, more preferably from 80% by mass to 97% by mass, and still more preferably from 85% by mass to 95% by mass, with respect to the total amount of the copolymer.

The ethylene-unsaturated carboxylic acid copolymer as a base polymer may or need not contain other structural units in addition to the ethylene unit and the unsaturated carboxylic acid unit.

An example of other structural units includes an unsaturated carboxylic acid ester unit. A preferred aspect of the unsaturated carboxylic acid ester unit is similar to the preferred aspect of the (meth)acrylic acid ester unit in the resin (A) described above.

A total content of the ethylene unit and the unsaturated carboxylic acid unit in the ethylene-unsaturated carboxylic; acid copolymer is preferably 80% by mass or more and more preferably 90% by mass or more with respect to a total amount of the ethylene-unsaturated carboxylic acid copolymer.

In the ionomer of the ethylene-unsaturated carboxylic acid copolymer, the type of metal ion for neutralizing the acidic group in the ethylene-unsaturated carboxylic acid copolymer (that is, a base polymer) is not particularly limited.

Examples of the metal ion include: an alkali metal ion such as a lithium ion, a sodium ion, a potassium ion, a rubidium ion, and a cesium ion; an alkali earth metal ion such as a magnesium ion and a calcium ion; a transition metal ion such as a zinc ion; and various metal ions such as an aluminum ion.

The metal ion is preferably at least one selected from the group consisting of a zinc (Zn) ion, a magnesium (Mg) ion, and a sodium (Na) ion, and more preferably at least one of a zinc ion or a sodium ion, and still more preferably a sodium ion.

The metal ion for neutralizing the acidic group in the base polymer may be used singly, or in combination of two or more kinds thereof.

A neutralization degree of the ionomer of the ethylene-unsaturated carboxylic acid copolymer is preferably 90% or less, more preferably from 5% to 80%, and still more preferably from 10% to 70%.

When the neutralization degree is 90% or less, an ion aggregate can be appropriately suppressed, degradation of fluidity can be further suppressed, and molding workability can be further appropriately maintained.

When the neutralization degree is 5% or more, a performance of the ionomer can be further efficiently exhibited.

Here, "the neutralization degree (%)" refers to a ratio (mol %) of a carboxyl group obtained by being neutralized with the metal ion to all the carboxyl groups included in the ethylene-unsaturated carboxylic acid copolymer (base polymer).

A melt flow rate (MFR: measured in accordance with JIS K7210-1999 under a condition at 190° C. and 2,160 g load) of the ionomer of the ethylene-unsaturated carboxylic acid copolymer is preferably from 0.1 g/10 min to 100 g/10 min, more preferably from 0.3 g/10 min to 50 g/10 min, and still more preferably from 0.5 g/10 min to 20 g/10 min, from the viewpoint of workability.

Ethylene-Unsaturated Ester Copolymer

The substrate layer may contain at least one ethylene-unsaturated ester copolymer.

The ethylene-unsaturated ester copolymer includes an ethylene unit and an unsaturated ester unit (that is, a structural unit derived from an unsaturated ester).

The ethylene-unsaturated ester copolymer may be any of a block copolymer, a random copolymer, and a graft copolymer.

Examples of the unsaturated ester for forming the unsaturated ester unit include: vinyl ester such as vinyl acetate and vinyl propionate; and (meth)acrylic acid ester such as methyl (meth)acrylate, ethyl (meth)acrylate, isobutyl (meth)acrylate, n-butyl (meth)acrylate, and isooctyl (meth)acrylate.

Among them, the unsaturated ester is preferably at least one of vinyl acetate or (meth)acrylic acid ester.

As the ethylene-unsaturated ester copolymer, an ethylene-vinyl acetate copolymer or an ethylene-(meth)acrylic acid ester copolymer is preferable, and an ethylene-vinyl acetate copolymer is more preferable.

A content of the unsaturated ester unit is preferably from 1% by mass to 40% by mass, more preferably from 2% by mass to 30% by mass, and still more preferably from 5% by mass to 25% by mass, with respect to a total amount of the ethylene-unsaturated ester copolymer.

A content of the ethylene unit is preferably from 60% by mass to 99% by mass, more preferably from 70% by mass to 98% by mass, and still more preferably from 75% by mass to 95% by mass, with respect to the total amount of the ethylene-unsaturated ester copolymer.

The ethylene-unsaturated ester copolymer may or need not contain other structural units in addition to the ethylene unit and the unsaturated ester unit.

A total content of the ethylene unit and the unsaturated ester unit in the ethylene-unsaturated ester copolymer is preferably 80% by mass or more and more preferably 90% by mass or more with respect to a total amount of the ethylene-unsaturated ester copolymer.

In the case in which the substrate layer contains the ethylene-unsaturated ester copolymer, it is preferable that the ethylene-unsaturated ester copolymer in the substrate layer has a crosslinked structure. Thereby, the puncture strength of the substrate layer and the laminate is further increased.

Examples of a method of forming a crosslinked structure include a thermally crosslinking method, an electron-beam crosslinking method, and a radiation crosslinking method. Among them, an electron-beam crosslinking method is preferable from the viewpoint of crosslinking efficiency and hygiene.

A melt flow rate (MFR: measured in accordance with JIS K7210-1999 under a condition at 190° C. and 2,160 g load) of the ethylene-unsaturated ester copolymer is preferably from 0.1 g/10 min to 100 g/10 min, more preferably from 1 g/10 min to 50 g/10 min, and still more preferably from 1 g/10 min to 30 g/10 min, from the viewpoint of workability.

From the viewpoint of improving the extensibility and the puncture strength of the laminate, it is preferable that the substrate layer contains at least one selected from the group consisting of the ionomer of the ethylene-unsaturated carboxylic acid copolymer and the ethylene-unsaturated ester copolymer having a crosslinked structure.

Other Components

The substrate layer may contain other components such as an additive.

A total amount of the ionomer of the ethylene-unsaturated carboxylic acid copolymer and the ethylene-unsaturated ester copolymer is preferably 80% by mass or more and more preferably 90% by mass or more with respect to the total amount of the substrate layer.

Sealant Layer

The sealant layer is a layer containing the resin composition for a sealant of the disclosure described above.

A structure of the sealant layer may be a single layer structure and may be a laminated structure including two or more layers.

The sealant layer is produced, for example, by melt extrusion using the resin composition for a sealant of the disclosure (and other components such as an additive, if necessary).

In the sealant layer, the content of the resin composition for a sealant of the disclosure is preferably 80% by mass or more and more preferably 90% by mass or more with respect to a total amount of the sealant layer.

A shape of the laminate of the disclosure is not particularly limited and is appropriately a sheet shape (that is, film shape).

A thickness of the laminate of the disclosure is not particularly limited, and is preferably from 40 μm to 300 μm, more preferably from 50 μm to 300 μm, and still more preferably from 50 μm to 200 μm.

A thickness of the sealant layer of the laminate is not particularly limited, and is preferably from 1 μm to 500 μm, more preferably from 2 μm to 30 μm, and still more preferably from 3 μm to 20 μm.

A thickness of the substrate layer of the laminate (a total thickness in a case of a laminated structure including two or more layers) is not particularly limited, and is preferably from 40 μm to 300 μm, more preferably from 50 μm to 300 μm, and still more preferably from 50 μm to 200 μm.

Preferred Method of Producing Laminate

The laminate of the disclosure can be produced using a known method.

Examples of a method of producing a laminate include an extrusion lamination method, a coextrusion inflation method, and a coextrusion T type method.

Among them, a coextrusion T type method is preferable from the viewpoint of controlling the thickness of the laminate.

Preferred Application of Laminate

An application of the laminate of the disclosure is not particularly limited.

A preferred application of the laminate of the disclosure is similar to the preferred application of the resin composition for a sealant of the disclosure described above.

Packaging Material

The packaging material of the disclosure includes the laminate of the disclosure described above.

Therefore, the packaging material has excellent heat-sealing strength with respect to the substrate, and in which the sealant layer has a reduced elution amount into normal heptane.

It is preferable that the packaging material of the disclosure further includes a substrate.

Examples of such a packaging material include a packaging material which is a set including a substrate and a laminate, and an integrated packaging material in which a portion of a substrate and a portion of a sealant layer of a laminate are adhered to each other.

As the substrate, a substrate containing a resin is preferable.

An example of the resin is as described in the section of "the resin composition for a sealant". Examples include polyethylene (PE), polypropylene (PP), polystyrene (PS), high-impact polystyrene (HIPS), polyethylene terephthalate (PET), a mixture of polyethylene (PE) and polybutene (PB), or a mixture of polyethylene (PE) and polypropylene (PP), and polypropylene (PP) is preferable.

The substrate may contain other components such as a filler and an additive.

A content of the resin in the substrate is preferably 80% by mass or more and more preferably 90% by mass or more with respect to a total amount of the substrate.

A shape of the substrate is not particularly limited.

Examples of the shape of the substrate include a sheet shape (that is, film shape) and a container shape such as a tray shape. In a case in which a film is used as a substrate containing PE, PP, PS, HIPS, or PET, the film may be a stretched film or a non-stretched film. Examples of a substrate containing a mixture of PE and PB or a mixture of PE and PP include a cohesive failure film.

A structure of the substrate may be a single layer structure and may be a laminated structure including two or more layers.

A thickness of the substrate (a total thickness in a case of a laminated structure including two or more layers) is not particularly limited, and is preferably 0.05 mm or more, more preferably 0.1 mm or more, and still more preferably 0.2 mm or more, from the viewpoint of securing a performance in a case in which the substrate is used as a container.

An upper limit of the thickness of the substrate is, for example, 5 mm or less, 3 mm or less, and 2 mm or less.

From the viewpoint of securing a performance in the case in which the substrate is used as a container, it is preferable that the thickness of the substrate is greater than a thickness of the laminate.

A ratio of the thickness of the substrate to the thickness of the laminate (that is, a ratio of [thickness of substrate/thickness of laminate]) is preferably 1.5 or more, more preferably 2.0 or more, and still more preferably 3.0 or more.

An upper limit of the ratio [thickness of substrate/thickness of laminate] is, for example, 30 or less, 20 or less, and 15 or less.

An application of the packaging material of the disclosure is not particularly limited.

A preferred application of the packaging material of the disclosure is similar to the preferred application of the resin composition for a sealant of the disclosure described above.

Package

The package of the disclosure includes the substrate, the laminate of the disclosure, and the packaged object packaged by the substrate and the laminate.

Since the packaging material of the disclosure includes the laminate, the packaging material of the disclosure has a reduced elution amount of the sealant layer into normal heptane and excellent heat-sealing strength between the substrate and the laminate.

Preferred aspects of the substrate, the laminate, and the packaged object are as described above.

In particular, it is preferable that the package of the disclosure is a skin pack package (that is, a package obtained by skin pack packaging).

EXAMPLES

Hereinafter, Examples of the disclosure will be described, and the disclosure is not limited to the following Examples.

Hereinafter, a melt flow rate (MFR) was measured in accordance with JIS K7210-1999.

Hereinafter, an "ethylene unit content", a "methylacrylate unit content", and a "vinyl acetate unit content" mean a content of a structural unit derived from ethylene, a content of a structural unit derived from methylacrylate, and a content of a structural unit derived from vinyl acetate, respectively.

Examples 1 to 10 and Comparative Examples 1 to 5

Production of Resin Composition for Sealant

The following components were mixed at a mixing ratio shown in Tables 1 and 2 so that a charged amount is 10 kg. The resulting mixture was put into an extruder (65 mmφ, L/D=28, front tip Dulmage flight screw) and melt-kneaded at a processing temperature of 160° C., thereby obtaining resin compositions for a sealant of Examples and Comparative Examples.

Each of blanks in Tables 1 and 2 means that the corresponding component is not contained.

Resin (A)

EMA1 (comparative resin): ethylene-methyl acrylate copolymer [91% by mass of ethylene unit content, 9% by mass of methylacrylate unit content (written as "MA9%" in Tables 1 and 2), and MFR (190° C., a load of 2,160 g) of 6 g/10 min, produced by high-pressure radical polymerization in accordance with tubular method]

EMA2: ethylene-methyl acrylate copolymer [80% by mass of ethylene unit content, 20% by mass of methylacrylate unit content (written as "MA20%" in Tables 1 and 2), and MFR (190° C., a load of 2,160 g) of 8 g/10 min, produced by high-pressure radical polymerization in accordance with tubular method]

EMA3: ethylene-methyl acrylate copolymer [76% by mass of ethylene unit content, 24% by mass of methylacrylate unit content (written as "MA24%" in Tables 1 and 2), and MFR (190° C., a load of 2,160 g) of 20 g/10 min, produced by high-pressure radical polymerization in accordance with tubular method]

Tackifying Resin (B)

"ARKON AM-1" (an alicyclic hydrocarbon resin having a ring and ball method softening point of 115° C.) produced by Arakawa Chemical Industries, Ltd.

Resin (C)

EVA1: ethylene-vinyl acetate copolymer [94% by mass of ethylene unit content, 6% by mass of vinyl acetate unit content (written as "VA6%" in Tables 1 and 2), and MFR (190° C., a load of 2,160 g) of 7 g/10 min]

EVA2: ethylene-vinyl acetate copolymer [90% by mass of ethylene unit content, 10% by mass of vinyl acetate unit content (written as "VA10%" in Tables 1 and 2), and MFR (190° C., a load of 2,160 g) of 9 g/10 min]

EVA3: ethylene-vinyl acetate copolymer [81% by mass of ethylene unit content, 19% by mass of vinyl acetate unit content (written as "VA19%" in Tables 1 and 2), and MFR (190° C., a load of 2,160 g) of 15 g/10 min]

Resin (D)

PO-1: ethylene-1-butene copolymer [density of 885 kg/m$^3$, and MFR (190° C., a load of 2,160 g) of 3.7 g/10 min (Tafmer A4085S produced by Mitsui Chemicals, Inc.)]

PO-2: ethylene-propylene copolymer [density of 875 kg/m$^3$, and MFR (190° C., a load of 2,160 g) of 2 g/10 min (Tafmer P0275 produced by Mitsui Chemicals, Inc.)]

PO-3: ethylene-1-octene copolymer [density of 870 kg/m$^3$, and MFR (190° C., a load of 2,160 g) of 5 g/10 min (Tafmer H5030S produced by Mitsui Chemicals, Inc.)]

Styrene-based elastomer 1: polystyrene-poly(ethylene-butylene)-polystyrene triblock copolymer (SEBS) [density of 900 kg/m$^3$, and MFR (230° C., a load of 5,000 g) of 22 g/10 min (Kraton G1657 produced by Kraton Corporation)]

Slipping Agent Masterbatch

Mixture of erucic acid amide as a slipping agent (2 parts by mass), silica (20 parts by mass), and an ethylene-vinyl acetate copolymer as a base polymer (78 parts by mass) (M445 produced by Du Pont-Mitsui Polychemicals Co., Ltd.)

Production of Laminate

Production of Laminate Having Layer Structure A: Examples 1 to 8, and 10, and Comparative Examples 1 to 5

Cast molding was performed under a condition of a processing speed of 25 m/min by using the resin composition for a sealant, the following HDPE, and the following ionomer as a raw material with a three-kind three-layer cast molding machine of 40 mmφ, thereby obtaining a film-shaped laminate having the following layer structure A and a thickness of 100 μm.

HDPE: HI-ZEX 3300F produced by Prime Polymer Co., Ltd. (high-density polyethylene, density of 950 kg/m$^3$, and MFR (190° C., a load of 2,160 g) of 1.1 g/10 min)

Ionomer: Na neutralized product (Na neutralization degree of 50% and MFR (190° C., a load of 2,160 g) of 1.3 g/10 min) of ethylene-methacrylic acid copolymer (90% by mass of ethylene unit content and 10% by mass of methacrylic acid unit content)

Layer structure A: HDPE layer/ionomer layer/sealant layer (layer ratio of [HDPE layer/ionomer layer/sealant layer]=10/80/10 or 10/85/5, Tables 1 and 2 show the details)

In the layer structure A, the sealant layer is a layer derived from the resin composition for a sealant, the HDPE layer is a layer derived from the HDPE, and the ionomer layer is a layer derived from the ionomer.

In the layer structure A, a portion of HDPE layer/ionomer layer is a substrate layer.

Production of Laminate Having Layer Structure B: Example 9

Cast molding was performed under a condition of a processing speed of 25 m/min by using the resin composition for a sealant, the EVA2, and the EVA3 as a raw material with a three-kind three-layer cast molding machine of 40 mmφ, thereby obtaining a film-shaped molded body having a three-layer structure. In the obtained molded body, the layer derived from EVA2 and the layer derived from EVA3 were subjected to electron-beam crosslinking, thereby obtaining a film-shaped laminate having the following layer structure B and a thickness of 100 μm.

Layer structure B: EVA2 layer/EVA3 layer/sealant layer (layer ratio of [EVA2 layer/EVA3 layer/sealant layer]=30/60/10)

In the layer structure B, the sealant layer is a layer derived from the resin composition for a sealant, the EVA2 layer is a layer derived from the EVA2 (in detail, a layer obtained by performing electron-beam crosslinking after cast molding), and the EVA3 layer is a layer derived from the EVA3 (in detail, a layer obtained by performing electron-beam crosslinking after cast molding).

In the layer structure B, a portion of EVA2 layer/EVA3 layer is a substrate layer.

Evaluation

The following evaluation was performed using the resin composition for a sealant and the laminate.

The results are shown in Tables 1 and 2.

Heat-Sealing Strength with Respect to Substrate

Production of Test Sample 1

The laminate was overlapped on a polypropylene (PP) sheet (F317DV produced by Prime Polymer Co., Ltd.) which is a substrate and has a thickness of 0.4 mm in a direction in which the sealant layer and the substrate of the laminate are in contact with each other, heat sealing was performed under conditions of a pressing force of 0.2 MPa, a heating temperature of 120° C., and a heating time of 1.0 second, and then the overlapped laminate was left for 24 hours at room temperature, thereby obtaining a test sample 1 having a layer structure of substrate layer/sealant layer/substrate.

Measurement of Peeling Strength

A test piece having a width of 15 mm was cut out from the obtained test sample 1.

A substrate side and a substrate layer side of the cut-out test piece were pulled in opposite directions (that is, a T-type peeling direction) and a peeling strength (N/15 mm) was obtained.

The peeling strength (N/15 mm) represents a heat-sealing strength with respect to the substrate of the resin composition for a sealant.

From the viewpoint of the heat-sealing strength with respect to the substrate of the resin composition for a sealant, the peeling strength (N/15 mm) is preferably 3 N/15 mm or more.

Elution Amount into Normal Heptane

Production of Test Sample 2

Cast molding was performed under a condition of a processing speed of 25 m/min by using the resin composition for a sealant and the following LDPE as a raw material with a three-kind three-layer cast molding machine of 40 mmφ, thereby obtaining a film-shaped test sample 2 having the following layer structure C and a thickness of 100 μm.

LDPE: low-density polyethylene, density of 917 kg/m$^3$, and MFR (190° C., a load of 2,160 g) of 3.7 g/10 min (MIRASON 16P produced by Du Pont-Mitsui Polychemicals Co., Ltd.)

Layer structure C: LDPE layer/LDPE layer/sealant layer (layer ratio of [LDPE layer/LDPE layer/sealant layer]=10/80/10 or 10/85/5, Tables 1 and 2 show the details)

In the layer structure C, the sealant layer is a layer derived from the resin composition for a sealant, and the LDPE layer is a layer derived from the LDPE.

In the layer structure C, a portion of LDPE layer/LDPE layer is a substrate layer.

In the evaluation of the elution amount into normal heptane, the reason that the layer structure of the laminate was the layer structure C (that is, reason that the substrate layer was LDPE layer/LDPE layer) is for appropriately evaluating the elution amount from the sealant layer into normal heptane by extremely reducing the elution amount from the substrate layer into normal heptane.

Elution Amount into Normal Heptane

In accordance with Notification No. 370 by The Ministry of Health and Welfare, normal heptane was brought into contact with the sealant layer of the test sample 2 at room temperature for 2 hours, and then the normal heptane was recovered.

The recovered normal heptane was evaporated with an evaporator, the residue was weighed, and then the elution amount (μg/mL) from the sealant layer (that is, the resin composition for a sealant) per 1 mL of normal heptane was calculated based on the weighed value.

From the viewpoint of hygiene, the elution amount (μg/mL) is preferably 30 μg/mL or less.

TABLE 1

| | | | Example 1 | Example 2 | Example 3 | Example 4 | Example 5 |
|---|---|---|---|---|---|---|---|
| Resin composition for sealant | Resin (A) | EMA 1 (MA9%) | | | | | |
| | | EMA 2 (MA20%) | 60 | 60 | 60 | | 60 |
| | | EMA 3 (MA24%) | | | | 60 | |
| | Tackifying resin (B) | AM-1 | 2 | 2 | 2 | 2 | 2 |
| | Resin (C) | EVA 1 (VA6%) | 38 | | | | |
| | | EVA 2 (VA10%) | | 38 | | 38 | 28 |
| | | EVA 3 (VA19%) | | | 38 | | |
| | Resin (D) | Styrene-based elastomer 1 | | | | | 10 |
| | | PO-1 | | | | | |
| | | PO-2 | | | | | |
| | | PO-3 | | | | | |
| | Slipping agent masterbatch | | 5 | 5 | 5 | 5 | 5 |
| Heat-sealing strength to substrate | Laminate | Layer structure | A | A | A | A | A |
| | | Layer ratio | 10/80/10 | 10/80/10 | 10/80/10 | 10/80/10 | 10/80/10 |
| | | Thickness of sealant layer (μm) | 10 | 10 | 10 | 10 | 10 |
| | Peeling strength (N/15 mm) | | 3.4 | 6.3 | 3.9 | 5.4 | 7.4 |
| Elution amount into normal heptane | Laminate | Layer structure | C | C | C | C | C |
| | | Layer ratio | 45/45/10 | 45/45/10 | 45/45/10 | 45/45/10 | 45/45/10 |
| | | Thickness of sealant layer (μm) | 10 | 10 | 10 | 10 | 10 |
| | Elution amount (μg/mL) | | 20 | 22 | 25 | 28 | 26 |

| | | | Example 6 | Example 7 | Example 8 | Example 9 | Example 10 |
|---|---|---|---|---|---|---|---|
| Resin composition for sealant | Resin (A) | EMA 1 (MA9%) | | | | | |
| | | EMA 2 (MA20%) | 50 | 50 | 98 | 60 | 50 |
| | | EMA 3 (MA24%) | | | | | |
| | Tackifying resin (B) | AM-1 | 2 | 2 | 2 | 2 | 2 |
| | Resin (C) | EVA 1 (VA6%) | | | | | |
| | | EVA 2 (VA10%) | 33 | 18 | | 38 | 18 |
| | | EVA 3 (VA19%) | | | | | |
| | Resin (D) | Styrene-based elastomer 1 | | | | | |
| | | PO-1 | | | | | |
| | | PO-2 | | 30 | | | |
| | | PO-3 | 15 | | | | 30 |
| | Slipping agent masterbatch | | 5 | 5 | 5 | 5 | 5 |
| Heat-sealing strength to substrate | Laminate | Layer structure | A | A | A | B | A |
| | | Layer ratio | 10/85/5 | 10/85/5 | 10/80/10 | 10/80/10 | 10/85/5 |
| | | Thickness of sealant layer (μm) | 5 | 5 | 10 | 10 | 5 |
| | Peeling strength (N/15 mm) | | 9.7 | 7.2 | 4.7 | 3.0 | 9.3 |
| Elution amount into normal heptane | Laminate | Layer structure | C | C | C | C | C |
| | | Layer ratio | 47/48/5 | 47/48/5 | 45/45/10 | 45/45/10 | 47/48/5 |
| | | Thickness of sealant layer (μm) | 5 | 5 | 10 | 10 | 5 |
| | Elution amount (μg/mL) | | 26 | 18 | 26 | 16 | 25 |

TABLE 2

|  |  |  | Comparative Example 1 | Comparative Example 2 | Comparative Example 3 | Comparative Example 4 | Comparative Example 5 |
|---|---|---|---|---|---|---|---|
| Resin composition for sealant | Resin (A) | EMA 1 (MA9%) |  | 60 |  |  |  |
|  |  | EMA 2 (MA20%) | 60 |  | 20 | 18 |  |
|  |  | EMA 3 (MA24%) |  |  |  |  |  |
|  | Tackifying resin (B) | AM-1 |  | 2 | 2 | 2 | 20 |
|  | Resin (C) | EVA 1 (VA6%) |  |  |  |  | 40 |
|  |  | EVA 2 (VA10%) | 40 | 38 | 78 | 50 |  |
|  |  | EVA 3 (VA19%) |  |  |  |  |  |
|  | Resin (D) | Styrene-based elastomer 1 |  |  |  |  |  |
|  |  | PO-1 |  |  |  |  | 40 |
|  |  | PO-2 |  |  |  | 30 |  |
|  |  | PO-3 |  |  |  |  |  |
|  |  | Slipping agent masterbatch | 5 | 5 | 5 | 5 | 5 |
| Heat-sealing strength to substrate | Laminate | Layer structure | A | A | A | A | A |
|  |  | Layer ratio | 10/80/10 | 10/80/10 | 10/80/10 | 10/85/5 | 10/80/10 |
|  |  | Thickness of sealant layer (μm) | 10 | 10 | 10 | 5 | 10 |
|  | Peeling strength (N/15 mm) |  | 0.3 | 0.4 | 2.0 | 2.9 | >10 |
| Elution amount into normal heptane | Laminate | Layer structure | C | C | C | C | C |
|  |  | Layer ratio | 45/45/10 | 45/45/10 | 45/45/10 | 47/48/5 | 45/45/10 |
|  |  | Thickness of sealant layer (μm) | 10 | 10 | 10 | 5 | 10 |
|  | Elution amount (μg/mL) |  | 10 | 28 | 20 | 16 | >200 |

As shown in Tables 1 and 2, each of the resin compositions for a sealant of Examples 1 to 10 had the reduced elution amount into normal heptane and excellent heat-sealing strength with respect to the substrate, the resin composition containing: a resin (A) which is an ethylene-(meth)acrylic acid ester copolymer in which a content of a (meth)acrylic acid ester unit is from 10% by mass to 25% by mass; and a tackifying resin (B), a content of the resin (A) being more than 45% by mass, and a content of the tackifying resin (B) being from 0.1% by mass to 10% by mass.

The resin composition for a sealant of Comparative Example 1 which contained no tackifying resin (B) had insufficient heat-sealing strength with respect to the substrate, as compared to each of the respective resin compositions for a sealant of the Examples.

The resin composition for a sealant of Comparative Example 2 in which a content of the (meth)acrylic acid ester unit in the ethylene-(meth)acrylic acid ester copolymer was less than 10% by mass also had insufficient heat-sealing strength with respect to the substrate.

Each of the resin compositions for a sealant of Comparative Examples 3 and 4 in which the content of the resin (A) was less than 45% by mass also had insufficient heat-sealing strength with respect to the substrate.

The resin composition for a sealant of Comparative Example 5 in which the content of the tackifying resin (B) was more than 10% by mass had the excessive elution amount into normal heptane.

Skin Pack Packaging Suitability

Skin pack packaging suitability for each of the laminates having the layer structure A in Examples 1 to 8 and 10, and the laminate having the layer structure B in Example 9 was confirmed as follows.

A wood piece having a height of 2 cm and an area of 50 cm² (10 cm in width×5 cm in length) as a packaged object was disposed on a polypropylene tray, and a laminate was disposed thereon, whereby the packaged object and the tray were entirely covered.

In this state, the packaged object was skin-pack packaged by the laminate as a packaging material and the tray with a tray sealer T200 produced by MULTIVAC under conditions of a set temperature of 130° C., a heating time of 1 second, and a vacuum degree of 10 mbar.

As a result, even in a case of using any laminate, it was possible to perform skin pack packaging in which the laminate follows the shape of the packaged object and was closely adhered to the packaged object, without generation of a hole and a wrinkle in the laminate.

From the above, it was confirmed that each of the laminates having the layer structure A in Examples 1 to 8 and 10, and the laminate having the layer structure B in Example 9 had the skin pack packaging suitability.

The disclosure of Japanese Patent Application No. 2018-225788 filed on Nov. 30, 2018, is hereby incorporated by reference in their entirety.

All the documents, patent applications and technical standards that are described in the present specification are hereby incorporated by reference to the same extent as if each individual document, patent application or technical standard is concretely and individually described to be incorporated by reference.

What is claimed is:

1. A resin composition for a sealant, comprising:
   a resin (A) that is an ethylene-(meth)acrylic acid ester copolymer in which a content of a (meth)acrylic acid ester unit is from 10% by mass to 25% by mass;
   a tackifying resin (B) having a ring and ball method softening point of from 100° C. to 130° C.;
   a resin (C) that is an ethylene-vinyl ester copolymer in which a content of a vinyl ester unit with respect to a total amount of the ethylene-vinyl ester copolymer is from 7% by mass to 13% by mass;
   a resin (D) that is at least one selected from the group consisting of an ethylene-α-olefin copolymer elastomer and a styrene-based elastomer; and
   an erucic acid amide,
   wherein a density of the ethylene-α-olefin copolymer elastomer is from 850 kg/m³ to less than 900 kg/m³, a content of the resin (A) is more than 45% by mass with respect to a total amount of resin components in the resin composition for a sealant, a content of the tackifying resin (B) is from 0.1% by mass to 3% by mass with respect to a total amount of resin components in the resin composition for a sealant, a content of the erucic acid amide is from 0.01% by mass to 0.096% by mass with respect to a total amount of resin components in the resin composition for a sealant, a total content of resin components is 80% by mass or more with respect to a total amount of the resin composition for a sealant, and an elution amount of the resin composition for a sealant into normal heptane is 30 μg/mL or less.

2. The resin composition for a sealant according to claim 1, wherein a content of the resin (D) is from 5% by mass to 40% by mass with respect to a total amount of resin components in the resin composition.

3. The resin composition for a sealant according to claim 1, used as a sealant for a packaging material.

4. The resin composition for a sealant according to claim 3, wherein the packaging material is for skin pack packaging.

5. A laminate, comprising:
a substrate layer; and
a sealant layer containing the resin composition for a sealant according to claim 1.

6. The laminate according to claim 5, wherein the substrate layer contains at least one selected from the group consisting of an ionomer of an ethylene-unsaturated carboxylic acid copolymer and an ethylene-unsaturated ester copolymer.

7. The laminate according to claim 5, wherein a thickness of the laminate is from 40 μm to 300 μm.

8. A packaging material, comprising the laminate according to claim 5.

9. The packaging material according to claim 8, further comprising a substrate.

10. The packaging material according to claim 9, wherein the substrate comprises polypropylene.

11. A package, comprising:
a substrate;
the laminate according to claim 5; and
a packaged object packaged by the substrate and the laminate.

* * * * *